United States Patent
Lim et al.

(10) Patent No.: US 11,164,322 B2
(45) Date of Patent: Nov. 2, 2021

(54) EYEBALL MOVEMENT ANALYSIS SYSTEM AND EYEBALL MOVEMENT ANALYSIS METHOD

(71) Applicant: IUCF-HYU (INDUSTRY-UNIVERSITY COOPERATION FOUNDATION HANYANG UNIVERSITY), Seoul (KR)

(72) Inventors: Han Woong Lim, Seoul (KR); Won June Lee, Seoul (KR); Yumi Song, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 16/560,228

(22) Filed: Sep. 4, 2019

(65) Prior Publication Data
US 2021/0065382 A1    Mar. 4, 2021

(51) Int. Cl.
G06T 7/246    (2017.01)
G06K 9/00     (2006.01)

(52) U.S. Cl.
CPC .......... *G06T 7/248* (2017.01); *G06K 9/00604* (2013.01); *G06T 2207/30201* (2013.01)

(58) Field of Classification Search
CPC .............................. G06T 7/248; G06K 9/00604
See application file for complete search history.

(56) References Cited

U.S. PATENT DOCUMENTS

2013/0182219 A1* 7/2013 Numajiri ................ A61B 3/113
                                                            351/206
2017/0007446 A1* 1/2017 Rill ....................... A61B 3/0025

FOREIGN PATENT DOCUMENTS

| JP | 2003271932 A | 9/2003 |
| JP | 2014-64938 A | 4/2014 |
| JP | 2018029764 A | 3/2018 |
| KR | 10-2004-0107677 A | 12/2004 |
| KR | 10-2005-0107105 A | 11/2005 |
| KR | 20150098500 A | 8/2015 |

* cited by examiner

*Primary Examiner* — Edward Park
(74) *Attorney, Agent, or Firm* — Sughrue Mion, PLLC

(57) ABSTRACT

Disclosed is an eyeball movement analysis system. The eyeball movement analysis system includes an image capturing unit configured to acquire a first image of an eyeball at a reference location and acquire a second image of the eyeball at a moved location, and an eyeball movement analyzing unit configured to calculate a rotational angle of the eyeball and a translational distance of the eyeball in a process of moving the eyeball from the reference location to the moved location through comparison of the first image and the second image.

5 Claims, 4 Drawing Sheets

EYEBALL MOVEMENT ANALYSIS SYSTEM AND EYEBALL MOVEMENT ANALYSIS METHOD

BACKGROUND OF THE INVENTION

1. Field of the Invention

The present invention relates to an eyeball movement analysis system and an eyeball movement analysis method, and more particularly, to an eyeball movement analysis method capable of analyzing a rotation and a translation of an eyeball.

2. Description of the Prior Art

An eyeball mainly rotates but also may translate.

In this regards, Korean Patent Application Publication No. 10-2004-0107677 discloses an eyeball movement measuring system for measuring rotations of an eyeball. The corresponding system obtains an optimum center and an optimum radius of a pupil, which is a circle (or an ellipse) by finding a border between the pupil and an iris by using a fan-shaped window in an image of an eyeball obtained by a camera, and removing a wrong border coordinate generated due to covering of the pupil due to an eyelid in the border coordinate and surrounding noise, such as an eyebrow by using the distances between the border coordinates. Further, the rotational angle of the eyeball is measured by using a pattern of an iris that is spaced apart from the border of the pupil by a predetermined distance.

According to the eyeball movement measuring system, the rotational angle due to the movement of the eyeball can be measured but the translational distance due to a translation of the eyeball cannot be measured.

SUMMARY OF THE INVENTION

The present invention provides an eyeball movement analysis system and an eyeball movement analysis method, by which a rotation and a translation of an eyeball can be easily analyzed from a movement of the eyeball.

The present invention also provides an eyeball movement analysis system and an eyeball movement analysis method, by which a translational distance can be calculated from a movement of an eyeball.

In accordance with an aspect of the present invention, an eyeball movement analysis system includes an image capturing unit configured to acquire a first image of an eyeball at a reference location and acquire a second image of the eyeball at a moved location, and an eyeball movement analyzing unit configured to calculate a rotational angle of the eyeball and a translational distance of the eyeball in a process of moving the eyeball from the reference location to the moved location through comparison of the first image and the second image.

The eyeball movement analyzing unit may calculate a contained angle between a segment of line connecting one point of the eyeball and the center of a pupil in the first image and a segment of line connecting one point of the eyeball and the center of the pupil in the second image as the rotation angle of the eyeball.

The eyeball movement analyzing unit may calculate the translational distance of the eyeball by using Equation 1 when the forward/rearward length of the eyeball is in a first range, and calculates the translational distance of the eyeball by using Equation 2 when the forward/rearward length of the eyeball is in a second range, $$y=0.52+0.07x-8.14e^{-4}x^2 \quad \text{[Equation 1]}$$

$$y=0.46+0.05x-4.93e^{-4}x^2 \quad \text{[Equation 2]}$$

wherein y is the translational distance of the eyeball, and x is the rotational angle of the eyeball.

The eyeball movement analyzing unit may determine that the translational distance of the eyeball is proportional to at least any one of the capacity of the orbit, the forward/rearward length of the orbit, and the leftward/rightward length of the orbit and is inversely proportional to at least any one of the forward/rearward length of the eyeball, the leftward/rightward length of the eyeball, and the capacity of the eyeball.

In accordance with an aspect of the present invention, an eyeball movement analysis method includes acquiring a first image of an eyeball at a reference location of the eyeball, acquiring a second image of the eyeball at a moved location of the eyeball, and calculating the rotational angle of the eyeball and the translational distance of the eyeball in a process of moving the eyeball from the reference location to the moved location through comparison of the first image and the second image.

The rotational angle of the eyeball may be calculated from a contained angle between a segment of line connecting one point of the eyeball and the center of a pupil in the first image and a segment of line connecting one point of the eyeball and the center of the pupil in the second image as the rotational angle of the eyeball.

The translational distance of the eyeball may be calculated by using Equation 1 when the forward/rearward length of the eyeball is in a first range, and the translational distance of the eyeball may be calculated by using Equation 2 when the forward/rearward length of the eyeball is in a second range, $$y=0.52+0.07x-8.14e^{-4}x^2 \quad \text{[Equation 1]}$$

$$y=0.46+0.05x-4.93e^{-4}x^2 \quad \text{[Equation 2]}$$

wherein y is the translational distance of the eyeball, and x is the rotational angle of the eyeball.

According to the eyeball movement analysis system and the eyeball movement analysis method according to the present invention, a rotational angle and a translational distance of an eyeball according to a movement of the eyeball can be calculated.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
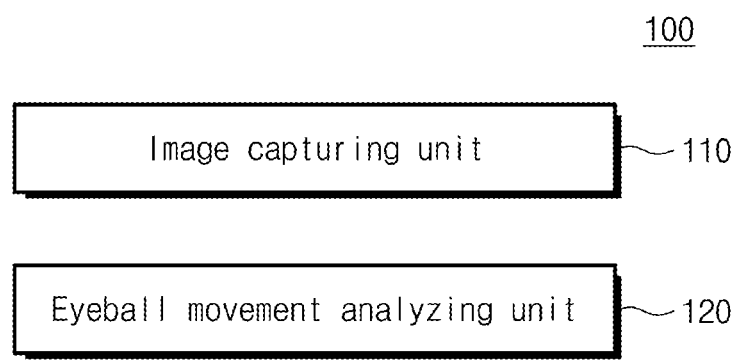
FIG. 1 is a view briefly illustrating an eyeball movement analysis system according to an embodiment of the present invention.

Hereinafter, preferred embodiments of the present invention will be described in detail with reference to the accompanying drawings. However, the technical spirit of the present invention is not limited to the embodiments, but may be realized in different forms. The embodiments introduced here are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the films and the areas are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combination thereof described in the specification are present, and may be understood that one or more other features, numbers, step, elements, or combinations thereof may be added. Further, in the specification, "connected to" is used to mean a plurality of elements are indirectly or directly connected to each other.

Further, in the following description of the present invention, a detailed description of known functions and configurations incorporated herein will be omitted when it may make the subject matter of the present invention unnecessarily unclear.

FIG. 1 is a view briefly illustrating an eyeball movement analysis system according to an embodiment of the present invention.

Referring to FIG. 1, an eyeball movement analysis system 100 includes an imaging capturing unit 110 and an eyeball movement analyzing unit 120.

The image capturing unit 110 photographs a movement of an eyeball. The image capturing unit 110 may generate a 3-dimensional image or 3-dimensional video corresponding to an image of an eyeball. According to an embodiment, the image capturing unit 110 may be a charge coupled device (CCD) sensor or a complementary metal semiconductor (CMOS) sensor. According to another example, the image capturing unit 110 may employ a magnetic resonance imaging device. Through an image captured by the magnetic resonance imaging device, the forward/rearward length, the leftward/rightward length, and the capacity of the eyeball can be known. Further, the capacity, the forward/rearward length, and the leftward/rightward length of an orbit can be known.

The image capturing unit 120 captures a first image of the eyeball at a reference location, and captures a second image of the eyeball at a moved location. The moved location is a location which the eyeball watches while changing the watching direction from the reference location. For example, if the eyeball watches the forward direction and then moves upwards and downwards or leftwards and rightwards, the reference location is the forward direction, and the moved location is any one of the upward, downward, leftward, and rightward directions.

The eyeball movement analyzing unit 120 calculates a rotational angle of the eyeball and a translational distance of the eyeball in a process of moving the eyeball from the reference location to the moved location through comparison of the first image and the second image.

Figure 2:
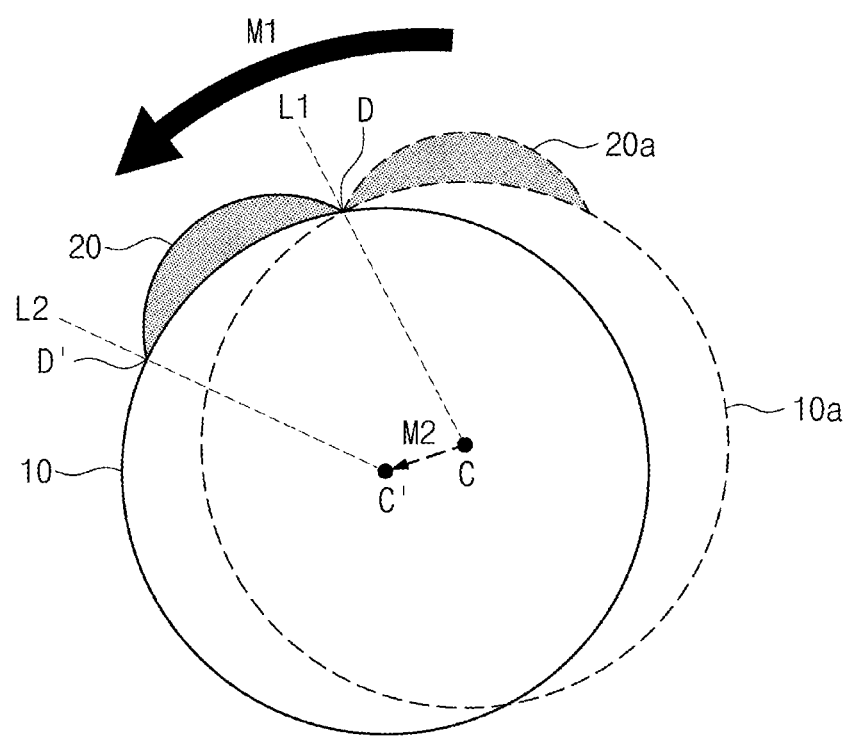
FIG. 2 is a view illustrating a movement of an eyeball according to the embodiment of the present invention.

FIG. 2 is a view illustrating a movement of an eyeball according to the embodiment of the present invention.

Referring to FIGS. 1 and 2, a rotation M1 and a translation M2 occur together in the movement of the eyeball 10. The rotational M1 means a movement in which the eyeball 10 rotates about an arbitrary axis C, and the translation M1 means a movement in which the eyeball 10 moves in one direction.

The eyeball movement analyzing unit 120 calculates a contained angle between a segment of line L1 connecting one point D of the eyeball 10a and the center C of a pupil in the first image and a segment of line L2 connecting one point D' of the eyeball 10 and the center C' of the pupil in the second image as the rotational angle of the eyeball. Here, the one point D of the eyeball 10 may be one point of a limbus corneae.

The eyeball movement analyzing unit 120 calculates a translational distance according to a translation M2 by using a rotational angle of the eyeball 10.

According to the embodiment, the eyeball movement analyzing unit 120 determines that the translational distance is inversely proportional to at least any one of the forward/rearward length (axial length) of the eyeball 10, the leftward/rightward length of the eyeball 10, the capacity of the eyeball 10, and the diameter of the cornea. In detail, it is determined that the translational distance decreases as the forward/rearward length of the eyeball 10 increases, the leftward/rightward length of the eyeball 10 increases, the capacity of the eyeball 10 increases, and the diameter of the cornea increases.

Further, the eyeball movement analyzing unit 120 determines that the translational distance is proportional to at least any one of the capacity of the orbit, the forward/rearward length of the orbit, and the leftward/rightward length of the orbit. In detail, it is determined that the translational distance increases as the capacity of the orbit increases, the forward/rearward length of the orbit increases, and the leftward/rightward length of the orbit increases.

Based on the above-described relationship, the eyeball movement analyzing unit 120 may calculate the translational distance of the eyeball 10 by using Equations 1 and 2. The eyeball movement analyzing unit 120 applies different equations according to the forward/rearward length of the eyeball 10. In detail, the translational distance of the eyeball 10 is calculated by using Equation 1 when the forward/rearward length of the eyeball 10 is in a first range, and the translational distance of the eyeball 10 is calculated by using Equation 2 when the forward/rearward length of the eyeball 10 is in a second range. According to the embodiment, the first range is 5 mm to 25 mm, and the second range is 26 mm to 40 mm.

$$y=0.52+0.07x-8.14e^{-4}x^2 \qquad \text{[Equation 1]}$$

$$y=0.46+0.05x-4.93e^{-4}x^2 \qquad \text{[Equation 2]}$$

Hereinafter, a method for analyzing a movement of an eyeball by using the above-described eyeball movement analysis system will be described.

Figure 3:
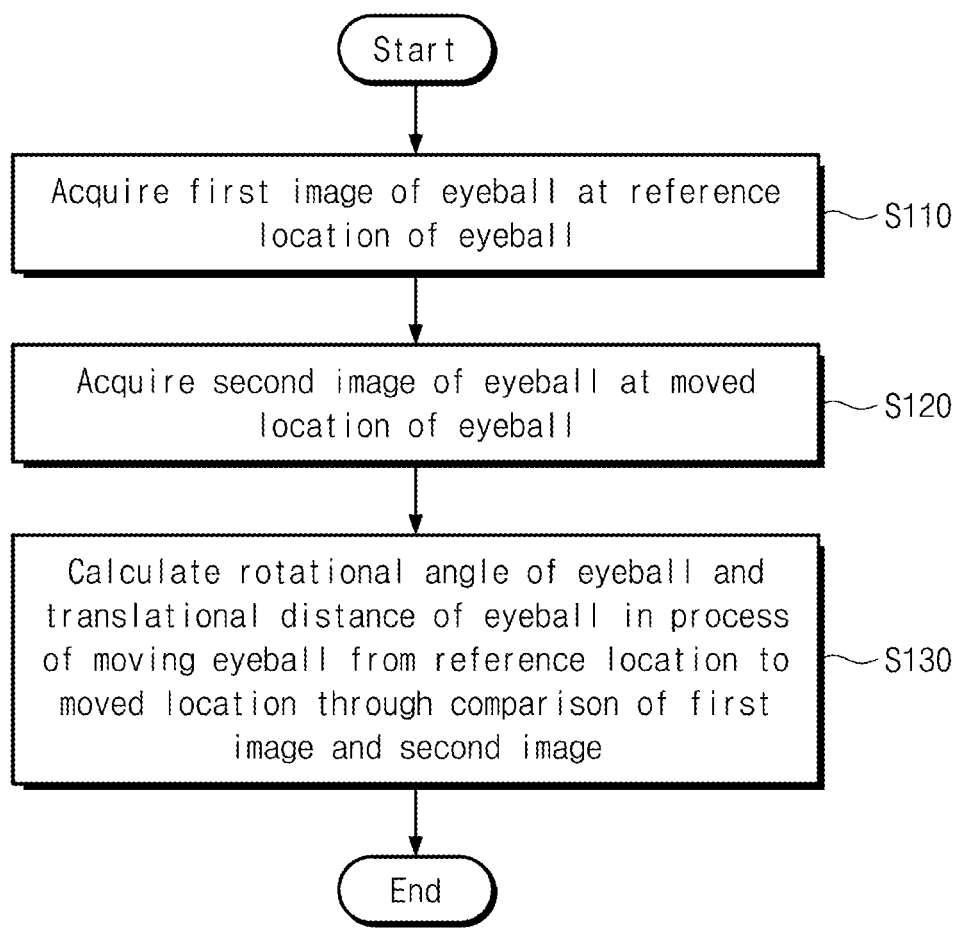
FIG. 3 is a flowchart illustrating an eyeball movement analysis method according to the present invention.

FIG. 3 is a flowchart illustrating an eyeball movement analysis method according to the present invention.

Referring to FIG. 3, the eyeball movement analysis method includes a step S100 of acquiring a first image of an eyeball at a reference location of the eyeball, a step S120 of acquiring a second image of the eyeball at a moved location of the eyeball, and a step S130 of calculating the rotational angle of the eyeball and the translational distance of the eyeball in a process of moving the eyeball from the reference location to the moved location through comparison of the first image and the second image.

In the step S110 of acquiring the first image of the eyeball, an image of the eyeball is generated while the eyeball watches a first direction. According to an embodiment, the first direction is a forward direction.

In the step S120 of acquiring the second image of the eyeball, an image of the eyeball that watches a second direction is generated after the eyeball is moved from the first direction to the second direction. The second direction may be any one of the upward direction, the downward direction, the leftward direction, and the rightward direction. Further, the directions may be any of combined directions.

In the step S130 of calculating the rotational angle and the translational distance of the eyeball, the rotational angle of the eyeball is calculated first. In order to calculate the rotational angle of the eyeball, a contained angle between a segment of line L1 connecting one point D of the eyeball 10a and the center C of a pupil in the first image and a segment of line L2 connecting one point D' of the eyeball 10 and the center C' of the pupil in the second image as the rotational angle of the eyeball is obtained. According to an example, in order to calculate the rotational angle of the eyeball 10, a contained angle between a segment of line L1 connecting one point D of the limbus cornea of the eyeball 10a and the center C of a pupil in the first image and a segment of line L2 connecting one point D' of the limbus corneae of the eyeball 10 and the center C' of the pupil in the second image as the rotational angle of the eyeball is obtained.

If the rotational angle of the eyeball is calculated, the translational distance of the eyeball 10 may be calculated by using Equations 1 and 2. Then, different equations are applied to the forward/rearward length of the eyeball 10 according to the forward/rearward length. In detail, the translational distance of the eyeball 10 is calculated by using Equation 1 when the forward/rearward length of the eyeball 10 is in a first range, and the translational distance of the eyeball 10 is calculated by using Equation 2 when the forward/rearward length of the eyeball 10 is in a second range. According to the embodiment, the first range is 5 mm to 25 mm, and the second range is 26 mm to 40 mm.

$$y=0.52+0.07x-8.14e^{-4}x^2 \quad \text{[Equation 1]}$$

$$y=0.46+0.05x-4.93e^{-4}x^2 \quad \text{[Equation 2]}$$

Figure 4:
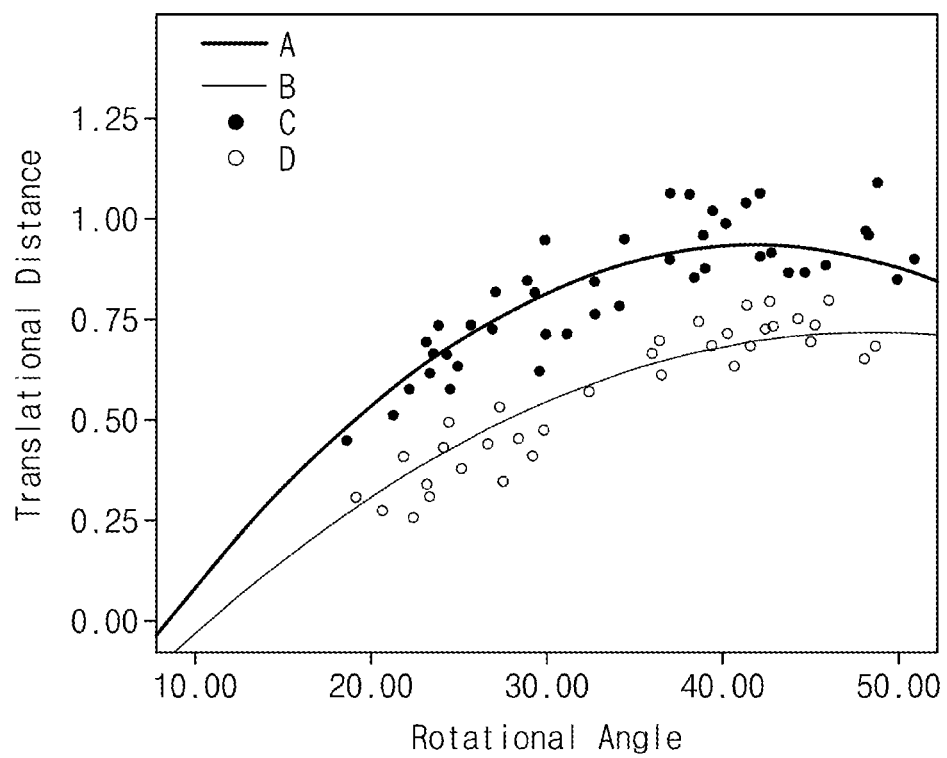
FIG. 4 is a graph illustrating a rotational angle and a translational distance of an eyeball calculated according to the embodiment of the present invention and an experimental example.

FIG. 4 is a graph illustrating a rotational angle and a translational distance of an eyeball calculated according to the embodiment of the present invention and an experimental example. The experimental example shows the rotational angle and the translational distance of the eyeball, which are calculated by directly analyzing the movement of the eyeball by a person. Graph 1 (A) is a graph according to Equation 1, and graph 2 (B) is a graph according to Equation 2. The blue circle C represents the rotational angle and the translational distance of the eyeball, which were actually measured for persons having forward/rearward lengths of the eyeballs in the first range according to the experimental example, and the green circle D represents the rotational angle and the translational distance of the eyeball, which were actually measured for persons having forward/rearward lengths of the eyeballs in the second range according to the experimental example.

Referring to FIG. 4, it can be seen that the rotational angle and the translational distance of the eyeball, which were measured according to the experimental example are generally represented on the graphs of Equations 1 and 2 of the present invention. Accordingly, an effect of easily calculating the rotational angle and the translational distance of the eyeball by using the above-described equations according to the present invention can be admitted.

Although the preferred embodiments of the present invention have been described in detail until now, the scope of the present invention is not limited to the embodiments and should be construed by the attached claims. Further, it should be understood that those skilled in the art to which the present invention pertains may variously correct and modify the present invention without departing from the scope of the present invention.

What is claimed is:

1. An eyeball movement analysis system comprising:
an image capturing sensor configured to acquire a first image of an eyeball at a reference location and acquire a second image of the eyeball at a moved location; and
an eyeball movement processor configured to calculate a rotational angle of the eyeball and a translational distance of the eyeball in a process of moving the eyeball from the reference location to the moved location through comparison of the first image and the second image,
wherein the eyeball movement processor calculates a contained angle between a segment of line connecting one point of the eyeball and a center of a pupil in the first image and a segment of line connecting one point of the eyeball and the center of the pupil in the second image as the rotational angle of the eyeball.

2. The eyeball movement analysis system of claim 1, wherein the eyeball movement processor calculates the translational distance of the eyeball by using Equation 1 when a forward/reward length of the eyeball is in a first range, and calculates the translation distance of the eyeball by using Equation 2 when the forward/rearward length of the eyeball is in a second range, $$y=0.52+0.07x-8.14e-4x2 \quad \text{[Equation 1]}$$

$$y=0.46+0.05x-4.93e-4x2 \quad \text{[Equation 2]}$$

wherein y is the translational distance of the eyeball, and x is the rotational angel of the eyeball.

3. The eyeball movement analysis system of claim 1, wherein the eyeball movement processor determines that the translational distance of the eyeball is proportional, to at least any one of a capacity of an orbit, a forward/rearward length of the orbit, and a leftward/rightward length of the orbit and is inversely proportional to at least any one of a forward/rearward length of the eyeball, a leftward/rightward length of the eyeball, and a capacity of the eyeball.

4. An eyeball movement analysis method comprising:
acquiring a first image of an eyeball at a reference location of the eyeball;

acquiring a second image of the eyeball at a moved location of the eyeball; and calculating a rotational angle of the eyeball and a translational distance of the eyeball in a process of moving the eyeball from the reference location to the moved location through comparison of the first image and the second image, wherein the rotational angle of the eyeball is calculated from a contained angle between a segment of line connecting one point of the eyeball and a center of a pupil in the first image and a segment of line connecting one point of the eyeball and the center of the pupil in the second image as the rotational angle of the eyeball.

5. The eyeball movement analysis method of claim 4, wherein the translational distance of the eyeball is calculated by using Equation 1 when a forward/rearward length of the eyeball is in a first range, and the translational distance of the eyeball is calculated by using Equation 2 when the forward/rearward length of the eyeball is in a second range, $$y = 0.52 + 0.07x - 8.14e{-}4x2 \qquad \text{[Equation 1]}$$

$$y = 0.46 + 0.05x - 4.93e{-}4x2 \qquad \text{[Equation 2]}$$

wherein y is the translational distance of the eyeball, and x is the rotational angle of the eyeball.

\* \* \* \* \*

UNITED STATES PATENT AND TRADEMARK OFFICE
CERTIFICATE OF CORRECTION

| | | |
|---|---|---|
| PATENT NO. | : 11,164,322 B2 | Page 1 of 1 |
| APPLICATION NO. | : 16/560228 | |
| DATED | : November 2, 2021 | |
| INVENTOR(S) | : Han Woong Lim, Won June Lee and Yumi Song | |

It is certified that error appears in the above-identified patent and that said Letters Patent is hereby corrected as shown below:

On the Title Page

Column 1 please insert the following:
--Foreign Application Priority Data
September 4, 2018 (KR) ............. 10-2018-0105233--

Signed and Sealed this
Nineteenth Day of April, 2022

Katherine Kelly Vidal
*Director of the United States Patent and Trademark Office*